US011815730B2

(12) United States Patent
Paasch

(10) Patent No.: US 11,815,730 B2
(45) Date of Patent: Nov. 14, 2023

(54) SANITARY IN-LINE SIGHT GLASS ASSEMBLY

(71) Applicant: Dixon Valve & Coupling Company, LLC, Chestertown, MD (US)

(72) Inventor: Kevin Paasch, Hartford, WI (US)

(73) Assignee: Dixon Valve & Coupling Company, LLC, Chestertown, MD (US)

( * ) Notice: Subject to any disclaimer, the term of this patent is extended or adjusted under 35 U.S.C. 154(b) by 899 days.

(21) Appl. No.: 16/833,730

(22) Filed: Mar. 30, 2020

(65) Prior Publication Data

US 2020/0310068 A1   Oct. 1, 2020

Related U.S. Application Data

(60) Provisional application No. 62/827,404, filed on Apr. 1, 2019.

(51) Int. Cl.
*G02B 7/00* (2021.01)
*G01N 21/01* (2006.01)
*G01P 13/00* (2006.01)
*G02B 7/02* (2021.01)

(52) U.S. Cl.
CPC ............ *G02B 7/007* (2013.01); *G01N 21/01* (2013.01); *G01P 13/008* (2013.01); *G02B 7/026* (2013.01)

(58) Field of Classification Search
CPC ........ G02B 7/007; G02B 7/026; G01N 21/01; G01N 2021/0392; G01N 2021/052; G01N 21/85; G01P 13/008
See application file for complete search history.

(56) References Cited

U.S. PATENT DOCUMENTS

| 1,042,730 | A  | * | 10/1912 | Walquist | G01P 13/008 |
| | | | | | 285/31 |
| 2,655,124 | A  | * | 10/1953 | Gary | G01P 13/008 |
| | | | | | 116/276 |
| 2,681,034 | A  | * | 6/1954 | Mannion | G01F 23/02 |
| | | | | | 220/663 |
| 5,243,929 | A  | | 9/1993 | Brown et al. | |
| 7,654,219 | B2 | * | 2/2010 | Armstrong | G02B 7/007 |
| | | | | | 116/276 |
| 9,151,420 | B2 | * | 10/2015 | McKiernan | F16L 23/10 |
| 9,249,909 | B2 | * | 2/2016 | Ikushima | F16K 27/02 |
| 10,966,404 | B2 | * | 4/2021 | Balkenhol | F16L 55/105 |

* cited by examiner

*Primary Examiner* — John Fitzgerald
*Assistant Examiner* — Tania Courson
(74) *Attorney, Agent, or Firm* — HOWSON & HOWSON LLP

(57) ABSTRACT

A sanitary in-line sight glass assembly is provided having separate first and second hollow connection bodies and a transparent tube retainable between and within the connection bodies when the connection bodies are secured together in an end-to-end abutting relationship. Gaskets are located within the connection bodies at opposite ends of the transparent tube and a clamp is provided for securing the ends of the connection bodies together such that the gaskets are compressed and form seals. The connection bodies include sidewalls having at least one opening through which the transparent tube is exposed for providing a viewing window into a flow path defined by the assembly. The clamp may be a circumferentially-extending clamp having ends secured together with a winged fastener able to be gripped by the hand of an installer such that the assembly can be assembled and disassembled manually without the use of a tool.

20 Claims, 3 Drawing Sheets ized through the use of many of these tools and techniques. Due to the possibility of harboring contaminants, bacteria, etc. in the mating connections, increased potential issues may result from incomplete disassembly for cleaning. Thus, the ease and frequency of disassembly is a factor in the design of such sight glass equipment.

SANITARY IN-LINE SIGHT GLASS ASSEMBLY

CROSS REFERENCE TO RELATED APPLICATIONS

This application claims the benefit under 35 USC § 119(e) of U.S. Provisional Patent Application No. 62/827,404, filed Apr. 1, 2019.

BACKGROUND

The present invention relates to sight glasses used, for instance, in food, dairy and beverage sanitary processes to view products and fluids flowing within sealed pipes, tubing, hoses, or like processing lines.

A typical production process will include the flow of a fluid-like substance through process lines. A sight glass may be installed in such process lines for the observation of relevant characteristics of the contents of the production process. This observation may be accomplished by visual inspections performed by personnel, measurement data gathered by instrumentation, or a combination of both.

In many industries, such as those concerned with the production of food, dairy, beverage, wine, beer, pet food, personal care, pharmaceutical, cosmetic, and chemical products and the like, sanitation requirements impose restrictions on the design of sight glasses. For instance, sanitary in-line sight glasses are typically designed without crevices that coed harbor harmful bacteria. Relatively frequent disassembly may be required to simplify cleaning processes. In addition, when assembled, contamination of the production process must be prevented.

Conventional in-line sight glass assemblies utilize a bolted assembly (see FIG. 1) or a threaded assembly (see FIG. 2) to provide a secure assembly and ensure proper gasket compression for sealing. These conventional assemblies may provide areas for contamination to occur reducing overall hygienic function while also adding difficulty and time to assembly and disassembly. The bolted and threaded styles generally require the use of tools to perform proper maintenance.

SUMMARY

According to an embodiment, a sight glass assembly is provided having separate first and second hollow connection bodies and a transparent tube retainable between and within the first and second hollow connection bodies when the first and second hollow connection bodies are secured together in an end-to-end abutting relationship. The assembly further includes a first gasket located within the first hollow connection body, a second gasket located within the second hollow connection body, and a fastener for securing an end of the first hollow connection body to an end of the second hollow connection body in the end-to-end abutting relationship such that the first gasket is compressed between the first hollow connection body and a first end of the transparent tube and forms a seal therebetween and the second gasket becomes compressed between the second hollow connection body and a second end of the transparent tube and forms a seal therebetween. At least one of the first and second hollow connection bodies includes a sidewall having at least one opening through which the transparent tube is exposed for providing a viewing window into a flow path defined by the assembly. In addition, the fastener includes wings for being gripped by the hand of an installer whereby the assembly is configured to be assembled and disassembled manually without the use of a tool.

DETAILED DESCRIPTION

Figures 1, 2:
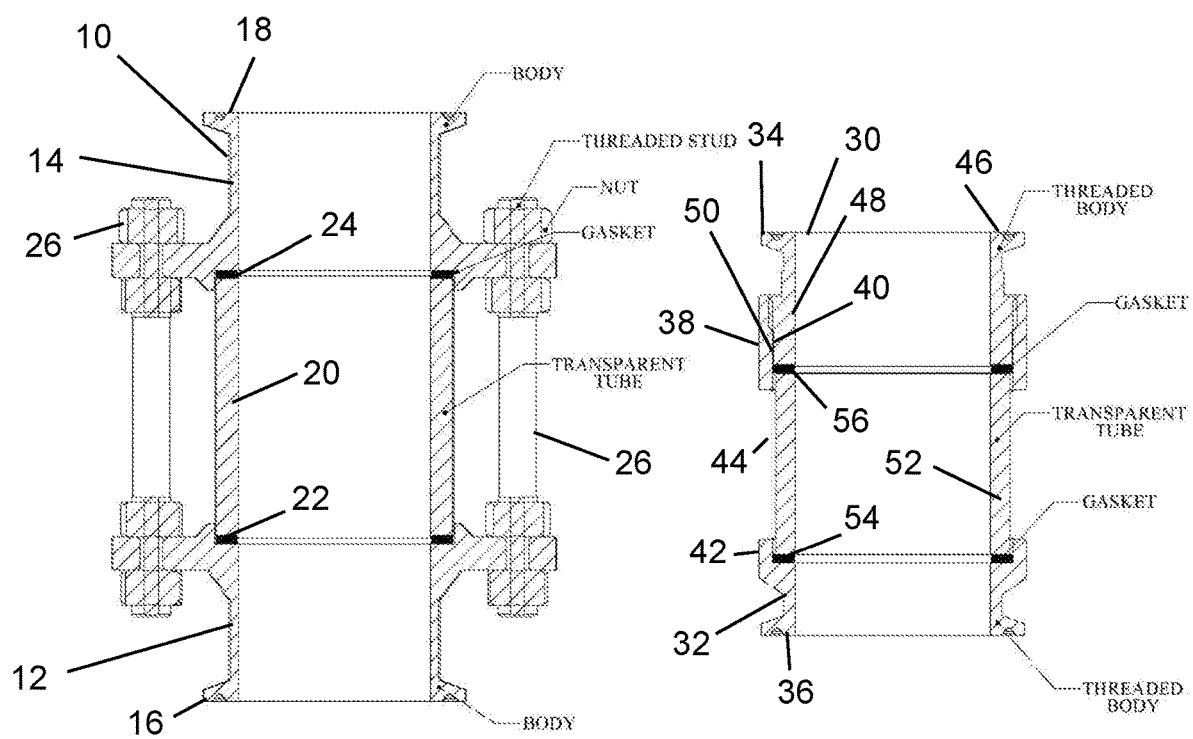
FIG. 1 is a cross-sectional view taken along a central longitudinal axis of an externally bolted sanitary in-line sight glass assembly according to the prior art.
FIG. 2 is a cross-sectional view taken along a central longitudinal axis of a threaded sanitary in-line sight glass assembly according to the prior art.

A conventional bolted style in-line sight glass assembly 10 is shown in FIG. 1. The assembly includes an opposed pair of connection bodies, 12 and 14, which may be bolted together in a spaced apart relation. Each of the connection bodies, 12 and 14, has a free-end, 16 and 18, for connection to a pipe or hose of a process line (not shown). A transparent tube (i.e., the sight glass) 20 is located between and separates the connection bodies, and elastomeric gaskets or seals, 22 and 24, are located at the ends of the transparent tube 20 within the connection bodies, 12 and 14. External elongate bolts, or threaded studs, and nuts 26 are used to interconnect the opposed and spaced apart connection bodies, 12 and 14. Thus, when the bolts, threaded studs, and nuts 26 are tightened, the transparent tube 20 is securely held between the opposed connection bodies, 12 and 14, with the gaskets or seals being compressed within the assembly 10 to seal the engagement between the tube 20 and the connection bodies, 12 and 14. Tools, such as a wrench or the like, are needed to tighten or loosen the nuts relative to the bolts or threaded studs 26.

A conventional threaded style in-line sight glass assembly 30 is shown in FIG. 2. The assembly 30 includes an opposed pair of connection bodies, 32 and 34. The connection body 32 includes a free-end 36 for connection to a pipe or hose of a process line (not shown), an opposite end 38 which has internal threaded surface 40, and an intermediate portion 42 that has openings 44. The connection body 34 includes a free-end 46 for connection to a pipe or hose of a process line (not shown) and an opposite end 48 which has an external threaded surface 50 that can be threaded or screwed relative to the internal threaded surface 40 of the connection body 32. A special wrench is required to tighten and/or loosen this threaded screw connection. A transparent tube (i.e., the sight glass) 52 is located between the connection bodies, 32 and 34, with elastomeric gaskets or seals, 54 and 56, located at the ends of the transparent tube 52. Thus, when the assembly is tightened together, the transparent tube 52 is securely held between the opposed connection bodies, 32 and 34, with the gaskets or seals, 54 and 56, being compressed to seal the engagement of the tube 52 with the connection bodies, 32 and 34.

According to an embodiment, which provides advantages over the above referenced prior art assemblies, a fluid handling assembly permits the application of light into equipment or pipelines for product observation. The assembly may be hollow with opposite open ends defining a flow path therethrough for a process liquid and may be generally cylindrical including a transparent tube preferably of polycarbonate or similar material. The edges of the transparent tube are sealed against opposed connection bodies on each end with gaskets or pressure seals. A connection clamp, which may be generally centered on the assembly, secures the opposed connection bodies together in an end-to-end abutting relationship in a manner ensuring proper gasket compression. The in-line sight glass assembly of the present invention eliminates assembly and disassembly inconveniences by eliminating the body bolts and threaded body designs. Rather, a tri-clamp style center connection of the bodies provides for ready assembly and disassembly of the in-line sight glass assembly without the use of tools while maintaining required functionality.

Figure 3:
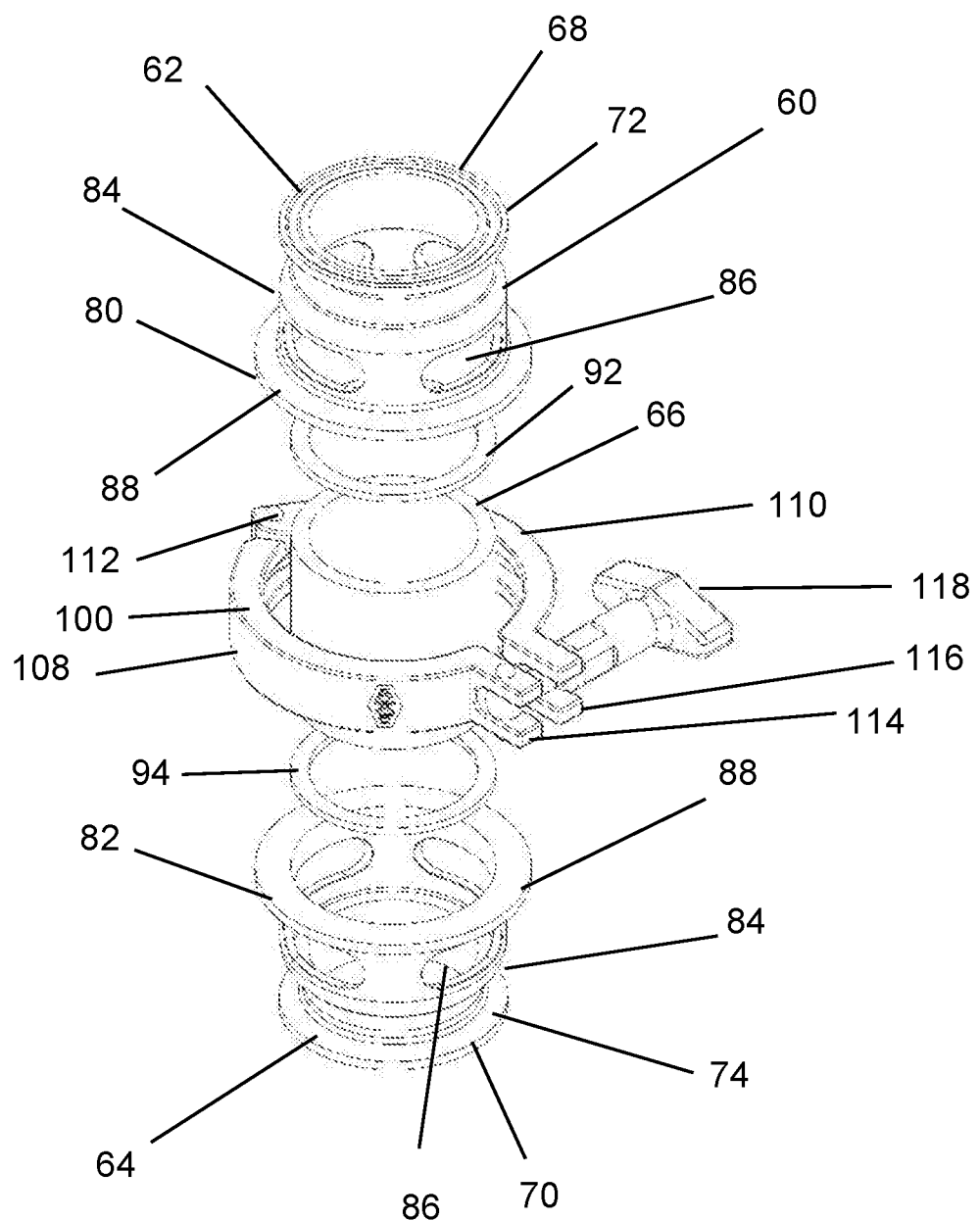
FIG. 3 is an exploded perspective view of a sanitary in-line sight glass assembly according to an embodiment.
Figure 4:
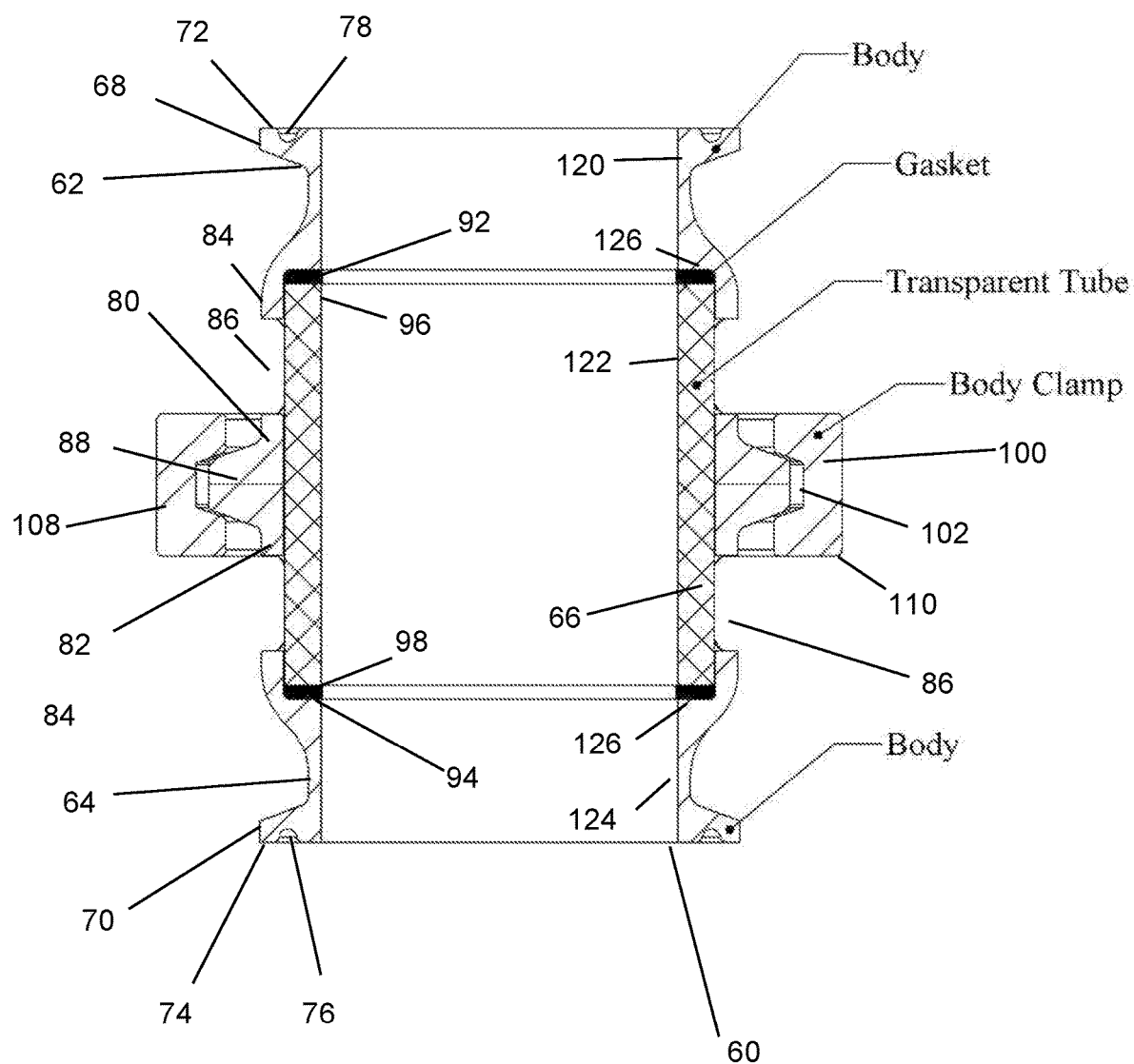
FIG. 4 is a cross-sectional view taken along a central longitudinal axis of a sanitary in-line sight glass assembly according to an embodiment.

As shown in FIGS. 3 and 4, an assembly 60 according to an embodiment includes an opposed pair of generally annular and hollow connection bodies, 62 and 64, providing connection points for process tubing/piping (not shown) and a housing for a transparent tube 66. According to some embodiments such as illustrated, the connection bodies, 62 and 64, may have an identical shape or configuration and may be interchangeable. Alternatively, the connection bodies may have different configurations and may not be interchangeable.

According to an embodiment, both connection bodies, 62 and 64, include a free end, 68 and 70, for being connected to process tubing, piping, hoses, or the like (for instance, the free ends, 68 and 70, may include a lip flange, 72 and 74, having grooves, 76 and 78, for a gasket or seal (not shown). In addition, both connection bodies, 62 and 64, include an end, 80 and 82, for connection to the opposed connection body in an end-to-end abutting relationship. Both connection bodies, 62 and 64, also include an intermediate section or sidewall 84 having a series of openings 86 providing viewing windows spaced apart along the circumference of the intermediate section 84. The ends, 80 and 82, of the connection bodies, 62 and 64, that are secured together in an abutting relationship may include lip flanges 88 or the like.

A transparent tube 66 is located within and secured between the connection bodies, 62 and 64, and provides a view point into a flow path defined by the assembly 60 while the assembly 60 remains sealed from the external environment. The transparent tube 66 extends through the intermediate sections 84 of both of the connection bodies, 62 and 64, such that the transparent tube 66 extends adjacent the openings 86 in the intermediate bodies 84. Thus, viewing of the process fluid under process pressure is enabled through the openings 86 of the intermediate sections 84 of the connection bodies, 62 and 64, which exposes sections of the transparent tube 66. See FIG. 4.

A pair of elastomeric gaskets, 92 and 94, are used to provide pressure seals between the ends, 96 and 98, of the transparent tube 66 and the connection bodies, 62 and 64, to allow pressure in process and to isolate the process fluid from the external environment. The elastomeric gaskets or seals, 92 and 94, may be in the shape of rings which may be flat or of other cross-sectional shape. When the assembly 60 is secured in a tight condition, the elastomeric gaskets, 92 and 94, are squeezed and compressed between engaging surfaces and form pressure seals of a required pressure level.

The opposed pair of connection bodies, 62 and 64, are secured together with a clamp 100, such as a body clamp, which, when tightened, results in compression of the elastomeric gaskets or seals, 92 and 94, and concentrically aligns the above referenced components of the assembly 60.

As shown in FIG. 4, the clamp 100 may extend circumferentially around the assembly 60, may have an inward facing tapered groove 102 providing a generally "C" shape in transverse cross-section, and may be used to secure lip flanges, 104 and 106, of the opposed connection bodies, 62 and 64, together. The lip flanges, 104 and 106, may have tapered surfaces corresponding to the tapered groove 102 of the clamp 100.

As shown in FIG. 3, the clamp 100 may be comprised of a pair of arms, 108 and 110, that are interconnected by a hinge 112 to permit the arms, 108 and 110, of the clamp 100 to be positioned between opened and closed positions when the arms, 108 and 110, are pivoted about the hinge 112.

Accordingly, the arms, 108 and 110, of the clamp 100 may initially be pivoted to an open position when extending the clamp 100 over the outer circumference of the lip flanges, 104 and 106, of the connection bodies, 62 and 64, and may then be pivoted to a closed position (to assume a substantially circular configuration) to engage the lip flanges, 104 and 106, and extend circumferentially about the lip flanges, 104 and 106. A wing nut, wing bolt, or like fastener 118 may be used to secure the otherwise free-ends, 114 and 116, of the arms, 108 and 110, together or to release engagement of the free ends, 114 and 116, of the arms, 108 and 110. Thus, after the clamp 100 is positioned over the lip flanges, 104 and 106, the wing nut or bolt 118 can be used to secure the free ends, 114 and 118, of the arms, 108 and 110, together and to tighten or compress the grip of the clamp 100 relative to the lip flanges, 104 and 106, of the connection bodies, 62 and 64, to apply pressure to squeeze the opposed lip flanges, 104 and 106, together, provide a tightly secured assembly, and provide structural strength and rigidity to the assembly 60. For instance, the sidewalls 84 of the connection bodies, 62 and 64, extend about and support the outer peripheral surface of the transparent tube 66.

The wing nut or bolt 118 may have grippable wings or the like that can be manipulated by hand (thumb and fingers) of an installer, without requiring the use of tools, to tightly secure the clamp 100 to the assembly 60 and to tightly secure the assembly 60 together and form seals with appropriate pressure strength needed to withstand process pressure. The wing nut or bolt 118 may also be manually manipulated by hand to loosen the clamp 100 for purposes of disassembling the assembly 60 for cleaning or other purposes. No tools are required for assembly/disassembly.

In the assembled condition, the sight glass assembly 60 provides a flow path therethrough defined by an inner surface 120 of part of the connection body 62, an inner surface 122 of the transparent tube 66, and an inner surface 124 of the connection body 64. In addition, as best shown in FIG. 4, the connection bodies, 62 and 64, each have an inner surface or ledge 126 that extends substantially perpendicular to the flow path through the assembly 60 and that provides a circumferential seat for the gasket, 92 or 94.

By way of example, and not by way of limitation, the transparent tube 66 may be made of plastic or glass, such as polycarbonate or borosilicate glass. The connection bodies, 62 and 64, may be made of stainless steel, and the gaskets may be made of an elastomer, such as nitrile rubber. The flow path defined by the assembly 60 may be cylindrical having a diameter of about 1 inch to about 4 inches (2.54 cm to 10.16 cm). For instance, the diameter may be 1 inch, 1.5 inch, 2 inches, 3 inches, or 4 inches as specific examples.

The foregoing description and specific embodiments are merely illustrative of the principles thereof, and various modifications and additions may be made to the apparatus by those skilled in the art, without departing from the spirit and scope of this invention.

I claim:

1. A sight glass assembly, comprising:
separate first and second hollow connection bodies;
a transparent tube retainable between and within the first and second hollow connection bodies when said first and second hollow connection bodies are secured together in an end-to-end abutting relationship;
a first gasket located within the first hollow connection body;
a second gasket located within the second hollow connection body; and
a fastener for securing an end of the first hollow connection body to an end of the second hollow connection body in the end-to-end abutting relationship such that the first gasket is compressed between the first hollow connection body and a first end of the transparent tube and forms a seal therebetween and the second gasket becomes compressed between the second hollow connection body and a second end of the transparent tube and forms a seal therebetween;
wherein at least one of the first and second hollow connection bodies includes a sidewall having at least one opening through which the transparent tube is exposed for providing a viewing window into a flow path defined by the assembly; and
wherein the fastener includes wings for being gripped by the hand of an installer whereby the assembly is configured to be assembled and disassembled manually without the use of a tool.

2. The sight glass assembly according to claim 1, wherein the fastener is a clamp including a wing bolt or a wing nut for use in tightening and securing the clamp in a closed position to complete the assembly and for loosening and releasing the clamp during disassembly.

3. The sight glass assembly according to claim 2, wherein the clamp extends circumferentially about the abutting ends of the first and second hollow connection bodies.

4. The sight glass assembly according to claim 3, wherein the abutting ends of the first and second hollow connection bodies each include a radially outward extending lip flange, and wherein the clamp secures the lip flanges together.

5. The sight glass assembly according to claim 4, wherein each of the lip flanges have a tapered wall engaged by the clamp, and wherein the clamp defines a groove with tapered walls that correspond with the tapered walls of the lip flanges such that as the clamp is tightened, the lip flanges slide further into the groove of the clamp.

6. The sight glass assembly according to claim 4, wherein the clamp has arms interconnected by a hinge allowing the arms to be pivoted to an open position or a closed position.

7. The sight glass assembly according to claim 1, wherein both of the first and second hollow connection bodies includes a sidewall having at least one opening through which the transparent tube is exposed for providing a viewing window into a flow path defined by the assembly.

8. The sight glass assembly according to claim 7, wherein each of the sidewalls of the first and second hollow connection bodies has multiple openings circumferentially spaced-apart about the sidewall.

9. The sight glass assembly according to claim 7, wherein the first hollow connection body is identical in shape and construction to the second hollow connection body and is interchangeable with the second hollow connection body.

10. The sight glass assembly according to claim 7, wherein the sidewalls of the first and second hollow connection bodies extend about and support the outer peripheral surface of the transparent tube.

11. The sight glass assembly according to claim 1, wherein each of the first and second hollow connection bodies has an opposite open end remote from the fastener such that the flow path defined by the assembly is defined by an inner surface of the first hollow connection body, an inner surface of the transparent tube, and an inner surface of the second hollow connection body.

12. The sight glass assembly according to claim 11, wherein the opposite open ends of the first and second hollow connection bodies remote from the fastener each has a radially outward extending lip flange.

13. The sight glass assembly according to claim 12, wherein the lip flanges of the opposite open ends of the first and second hollow connection bodies remote from the fastener each has a groove for an elastomeric gasket.

14. The sight glass assembly according to claim 1, wherein the first hollow connection body defines an inner surface that extends perpendicular to the flow path defined by the assembly and that provides a circumferential seat for the first gasket.

15. The sight glass assembly according to claim 14, wherein the second hollow connection body defines an inner surface that extends perpendicular to the flow path defined by the assembly and that provides a circumferential seat for the second gasket.

16. The sight glass assembly according to claim 1, wherein the transparent tube is made of plastic or glass.

17. The sight glass assembly according to claim 1, wherein the transparent tube is made of polycarbonate or borosilicate glass.

18. The sight glass assembly according to claim 1, wherein the first and second hollow connection bodies are made of stainless steel.

19. The sight glass assembly according to claim 1, wherein the first and second gaskets are made of an elastomer or a nitrile rubber.

20. The sight glass assembly according to claim 1, wherein the flow path defined by the assembly is cylindrical having a diameter of 1 inch to 4 inches (2.54 cm to 10.16 cm).

* * * * *